(No Model.)
M. J. REED.
CULTIVATOR ATTACHMENT.
No. 444,134. Patented Jan. 6, 1891.
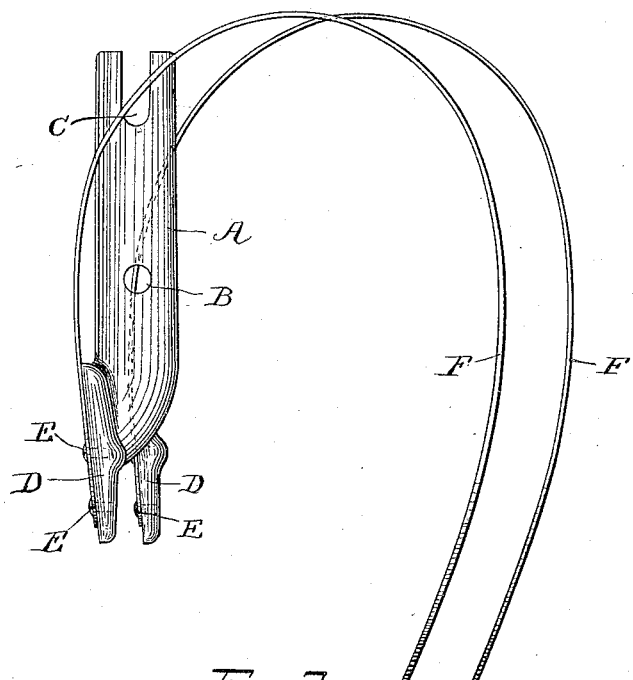
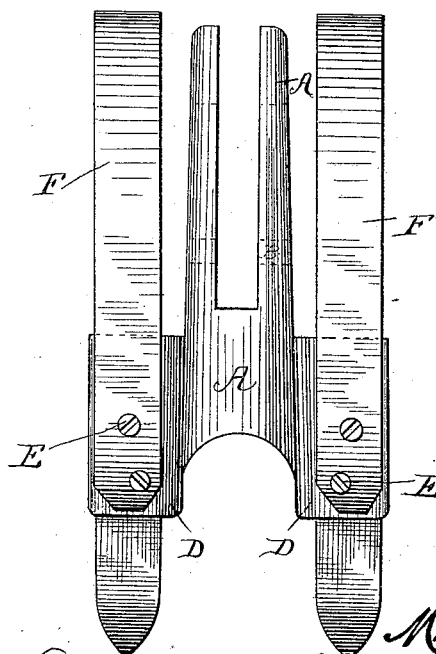
Witnesses
Albert Popkins.
Thomas G. Miller,
Inventor
Marshall J. Reed
By his Attorney
David A. Gourick

UNITED STATES PATENT OFFICE.

MARSHALL J. REED, OF ROANN, INDIANA.

CULTIVATOR ATTACHMENT.

SPECIFICATION forming part of Letters Patent No. 444,134, dated January 6, 1891.

Application filed October 23, 1890. Serial No. 369,022. (No model.)

*To all whom it may concern:*

Be it known that I, MARSHALL J. REED, a citizen of the United States, residing at Roann, in the county of Wabash and State of Indiana, have invented a new and useful Cultivator Attachment, of which the following is a specification.

My invention relates to an attachment that can be readily and conveniently secured and adjusted to any corn-plow, as more fully hereinafter specified; and the object of my invention is to provide for cultivating corn or other cereals in their initial growth in such manner as to clear out the weeds and accumulations between the rows and return the soil removed, as more fully hereinafter specified.

The above-mentioned objects I attain by the means illustrated in the accompanying drawings, in which—

Figure 1 represents a side elevation of my improved device, and Fig. 2 a front elevation thereof.

Referring to the drawings, the letter A indicates a standard constructed of any suitable material, preferably of metal. The said standard is slotted or bifurcated longitudinally, the slot being open at the upper end, as shown.

Through the members of the standard, near the lower portion thereof, are formed apertures B, through which a bolt may be passed to secure the standard to the beam of an ordinary plow.

The upper ends of the members of the standard are provided with short open slots C, through which may be passed a securing-pin, of wood or other suitable material, by which, in connection with the bolt above referred to, the standard may be fastened to the plow-beam.

The lower end of the standard is provided with lateral lugs D, one setting forward of the other, as shown. To the forward face of each of these lugs is secured, by means of bolts E or otherwise, a curved spring-arm F, which extends upward, backward, and downward. The free ends of the spring-arms form the shovels or shares for turning the soil.

It will be observed that by the arrangement of the lugs on the standard one of the spring-arms sets in advance of the other, so that the forward shovel will clear the weeds and accumulations from between the rows, making a furrow, while the share or shovel on the rear spring will follow and turn the weeds and matter removed by the forward share or shovel into the furrow made by the said forward shovel.

My improved attachment, as before stated, may be applied to any ordinary plow. This is accomplished by removing the bolt of the beam, taking off the shank to which the shovels are secured, and securing the standard of my improved attachment in place of the same. When in place the bifurcated portion of the standard embraces the plow-beam, and the standard, near its lower end, is loosely secured by the bolt passing through the apertures above mentioned.

Through the short open slots at the upper ends of the members of the standard when the same is in position is passed a pin of wood or other material, which will hold the standard and spring-arms in position while the shovels are passing through ordinary soil, but which will give way or break when the shovels or shares meet with any unusual resistance, such as stones or stumps, so as to allow the standard to swing on the bolt and prevent injury to the spring-arms.

Having thus described my invention, what I claim, and desire to secure by Letters Patent, is—

1. In an attachment for cultivators, the combination of a longitudinally slotted or bifurcated standard having lateral lugs at its lower end, located one in advance of the other, and the spring-arms or shares secured to said lugs, substantially as and for the purposes specified.

2. An attachment for a cultivator, consisting of a bifurcated standard having spring shovel or share arms, the said standard being provided with transverse apertures near its lower end for the passage of the bolt by which it may be secured to a plow-beam, and open slots at the upper ends of its members, through which may be passed a pin to secure said upper end to the plow-beam, the pin being of such nature as to yield or break when any undue strain is brought to bear upon the spring-arms, substantially as specified.

MARSHALL J. REED.

Witnesses:
H. I. BOWMAN,
G. E. HALDERMAN.